United States Patent Office 3,318,842
Patented May 9, 1967

3,318,842
STABILIZED POLYOLEFINS CONTAINING DI-LAURYL THIODIPROPIONATE AND HYDROXYARYLOXAMIC ACID ESTERS
Albert Marie Ernest Blachere, Villeurbanne, and Claude Jean Maurice Breant, Lyon, France, assignors to Rhone-Poulenc S.A., Paris, France, a French body corporate
No Drawing. Filed July 6, 1964, Ser. No. 380,624
Claims priority, application France, July 9, 1963, 940,876, Patent 1,370,092; May 4, 1964, 973,233
3 Claims. (Cl. 260—45.85)

This invention concerns polyolefin compositions having improved resistance to the action of oxygen and new compounds which are used in such compositions.

The problem of stabilising polyolefins in the molten state such as when working at temperatures as high as 350° C. for fairly long periods is of primary importance. This problem is of even greater importance with polyolefins including tertiary carbon atoms, such as polymers and copolymers of propylene, 1-butene, pentenes and methyl-pentenes as the presence of tertiary carbon atoms makes them much more susceptible to degradation by oxygen than linear polyethylenes.

It is therefore necessary to use anti-oxidising agents which have particularly great activity and which remain in close and permanent contact with the polymer, first of all during storage, then during its shaping and finally in the shaped objects themselves. Some agents suffer from the disadvantage that they migrate, in the course of time, towards the surface of the polymer, which is sometimes highly detrimental to the resulting product.

Various methods have been proposed for measuring the activity of anti-oxidising agents in polymers. In the particular case of polyolefins, the method described by Hawkins et al., J. Appl. Polym. Sci. 1, No. 1, pp. 37–42 (1959), makes it possible to select anti-oxidising agents having a particularly effective action. This method consists in determining the duration of the resistance of a stabilised polymer when exposed to an oxygen atmosphere in an enclosed space heated at 140° C. At the beginning of the exposure the absorption of oxygen is zero or very low, and then suddenly rapidly rises. The period for which the oxygen absorption is low, called the "induction period of oxygen absorption," is a measure of the activity of the anti-oxidising agent. In this text, the anti-oxidising agent may be added to the polymer by dry mixing, or better still by impregnating it with a solution or a dispersion of the anti-oxidising agent and then evaporating.

The stabilised polymer powder may be directly moulded, employing a compression press, or, in order to ensure better homogeneity, the stabilised powder may be extruded before it is moulded. In the latter case, the stabilised polymer is subjected to more stringent working conditions, such as the commonly adopted conditions involving temperatures of 200° C. and more.

It is obvious that in the latter case the conditions under which the powder is moulded necessitate a more active stabiliser than in the first case, because, even before the test for the measurement of resistance to oxidation, the polymer has been exposed to air at elevated temperature.

It has already been proposed to stabilise polyethylene with thiopropionic esters of higher alcohols in French Patent 956,489 but these esters do not always impart sufficient protection to polypropylene and higher polyolefins and it has been found necessary to use these esters in admixture with other known anti-oxidising agents, such as carbon black, polyphenols and thiodiphenols, to obtain an improved stabilising action.

We have now found that it is possible to stabilise polyolefins against degradation by thermal oxidation when there is added thereto from 0.01% to 3% of their weight of a diester of a long-chained fatty alcohol and of thiodipropionic acid, and from 0.01% to 3% of an ester of an oxamic acid of the formula:

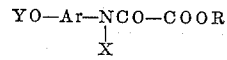

(I)

in which Ar is an arylene radical having one or more rings, which are unsubstituted or substituted by one or more hydrocarbon radicals, the radical YO— being in any position in the rings; R is an alkyl radical; X is a hydrogen atom, or a substituted or unsubstituted aliphatic, cycloaliphatic or aromatic hydrocarbon radical; Y is a hydrogen atom, or an acyl radical which is substituted or unsubstituted or bears one or more additional functional groups, for instance, an acyl radical selected from the group —CO—D—COOR and

in which D is selected from the group consisting of a carbon-carbon bond and divalent hydrocarbon radicals and X, R and Ar are as defined above.

These compositions give excellent results when their stability is determined by measurement of the induction period of the oxygen absorption as described above. While the admixed oxamic esters of lower alcohols impart sufficient stability for certain applications of polyolefins in which the polymer is not subjected to excessively high temperatures (e.g. in solution or dispersion) the oxamic esters of long-chained fatty alcohols are much more effective, and in the case of compositions which have been subjected to an additional extrusion treatment at 200–250° C., only mixtures containing a hydroxyaryl-oxamate of a fatty alcohol in which R is an alkyl group of 6 or more carbon atoms are effective.

The following derivatives conforming to the general Formula I in which Y represents a hydrogen atom, are known: ethyl N-(4-hydroxyphenyl)oxamate [Piutti, Ber. 31, 331 (1898)], ethyl N-(3-hydroxyphenyl)oxamate [Meyer, Ber. 32, 2117 (1899)], ethyl N-(1-hydroxy-3-naphthyl)oxamate [Meyer, Ber. 44, 1963 (1911)]. Hydroxyaryloxamates of the higher homologues of ethyl alcohol are not known, however, notably those in which the alkyl radical contains more than 6 carbon atoms which are particularly active as stabilisers. The esters of higher alcohols may be prepared by various known methods, for example by transesterification of N-hydroxyaryloxamates of lower alkyls with a higher aliphatic alcohol, or by reaction of an aminophenol with mixed oxalates of higher alcohols and lower alcohols, such as methyl or ethyl alcohol. In the first case, the transesterification is effected in the presence of a catalyst such as sulphuric acid or toluene-p-sulphonic acid. Better yields are obtained when the reaction is carried out in the presence of a molecular excess of higher alcohol in order to reduce the proportions of N,N'-bis(hydroxyaryl)oxamides formed as by-products. In the latter case, the amidation takes place by simple heating of equimolecular quantities of the aminophenol and of the mixed oxalic ester. In both cases, the yields are improved by eliminating the lower alcohol liberated, as and when it is formed. Whilst these two methods of preparation are convenient, any other known method of preparing amides or oxamides may be applied, for example reacting an aminophenol with an alkoxalyl chloride ClCOCOOR, in which R is as defined above.

Products conforming to general Formula I in which Y is a substituent other than hydrogen may be prepared from N-hydroxyaryloxamic esters by known methods, more particularly by the action of monocarboxylic or dicarboxylic acid chlorides (such as oxalyl chloride or an alkyloxalyl chloride) on monosubstituted oxamic esters. It is also possible to prepare them by reaction of alkyloxalyl chlorides or esters with N-monosubstituted hydroxyarylamines.

The hydroxylaryloxamic esters of Formula I are solid products which are soluble in aliphatic, cycloaliphatic and aromatic hydrocarbons, ketones (such as acetone and methylethylketone), methanol, ethanol and tetrahydrofuran.

Their solubility in volatile solvents which are neither solvents nor swelling agents for polyolefins is advantageous in the preparation of stabilised compositions by the impregnation method, but the compositions may also be prepared by mixing the polymer and the stabilising agents by mechanical means, such as a roll-type or ball-type mixer.

The precise ratio of the oxamic ester and the thiodipropionic ester may be varied in accordance with the conditions under which the polymers are to be worked and used, provided that the specified limits for each constituent are observed.

The following examples illustrate the preparation of N-hydroxyaryloxamic acid esters and their use in admixture with diesters of higher fatty alcohols of thiodipropionic acid, for the stabilisation of polyolefins against degradation by thermal oxidation.

*Example 1*

62.7 g. (0.3 mol) of ethyl N-(4-hydroxyphenyl)oxamate (prepared by the process described by Piutti and Piccoli, Chem. Ber. 31, 330–6 (1898)), 62 g. (0.334 mol) of 1-n-dodecanol and 1.5 g. of toluene-p-sulphonic acid are introduced into a 250-cc. three-necked round-bottomed flask provided with a mechanical stirrer and a distillation apparatus. The mixture is heated with stirring to a temperature sufficient to eliminate ethanol as it is formed. When the reaction is complete, the contents of the flask are cooled and extracted with 75 cc. of acetone and the insoluble matter is separated and washed on filter with 8×50 cc. of acetone. The solutions obtained are combined and the acetone is eliminated by evaporation in vacuo. The residue is extracted with 300 cc. of petroleum ether, in which the unconverted dodecanol is soluble. The product is filtered and the filter cake recrystallised successively from 850 cc.+800 cc. of ethanol (75%) and then from 1000 cc. of cyclohexane. After drying, 43.2 g. of a white solid product having a melting point of 103 ° C. is obtained, which is identified by gravimetric analysis and infra-red spectrography as dodecyl N - (4 - hydroxyphenyl)oxamate. Yield 41% calculated on the ethyl N-(4-hydroxyphenyl)oxamate employed.

*Example 2*

20.9 g. (0.1 mol) of ethyl N-(4-hydroxyphenyl)oxamate are reacted with 16.1 g. (0.124 mole) of 1-n-octanol in the presence of 0.5 g. of toluene-p-sulphonic acid using the same procedure as in Example 1. The mixture is heated at 210° C. for 2 hours 30 minutes. The reaction mass is extracted as in Example 1 and 6.6 g. of a product having a melting point of 96° C. is obtained, which is identified by gravimetric analysis and infra-red spectrography as octyl N-(4-hydroxyphenyl)oxamate. Yield 22.5%.

*Example 3*

The procedure of Example 1 is employed for the transesterification of ethyl N-(4-hydroxyphenyl)oxamate with 1-n-hexanol to produce hexyl N-(4-hydrophenyl)oxamate which, when purified by recrystallisation from benzene and dried, has a melting point of 150° C.

*Example 4*

18.5 g. of mixed ethyl and n-octadecyl oxalate prepared by the process described by Bader et al., J. Am. Chem. Soc. 74, 3992–4 (1952) and 5.45 g. of p-aminophenol are introduced into a 250 cc. three-necked round-bottomed flask provided with a stirring system and a reflux condenser. The mixture is heated at 160–180° C. for 2 hours and allowed to cool, and the reaction mass is then extracted with 50 cc. of acetone, the insoluble matter being separated by filtration. The filtrate is concentrated by evaporation and the residue extracted with 100 cc. of petroleum ether, the insoluble matter being collected on the filter. Recrystallisation of this insoluble matter from 250 cc. of ethanol (80%) and then drying the product in an oven produced 3.75 g. of a product which melts at 115° C., identified by gravimetric analysis and infra-red spectrography as octadecyl N-(4-hydroxyphenyl)oxamate. Yield 17%.

*Example 5*

8.6 g. of ethyl N-(3-hydroxy-4-methylphenyl)oxamate, 8 g. of 1-n-dodecanol and 0.2 g. of toluene-p-sulphonic acid are introduced into an apparatus identical to that of Example 1 and the mixture is heated to 209° C. for 2 hours 10 minutes, the ethanol being eliminated as it is formed. After cooling, the reaction mass is extracted with 350 cc. of methylethylketone, heated to the reflux temperature and then hot-filtered. The filtrate is concentrated by distillation in vacuo and the residue recrystallised from 350 cc.+90 cc. of ethanol (90%), separated and dried. 1.7 g. of a white solid product having a melting point of 180° C. is obtained, identified by gravimetric analysis and infra-red spectrography as dodecyl N-(3-hydroxy-4-methylphenyl)oxamate. Yield 12.5%.

The ethyl N - (3 - hydroxy - 4 - methylphenyl)oxamate, which is employed as starting material, is a new solid product of flaked appearance, having a melting point of 226° C., and being insoluble in acetone and ethyl ether. It was prepared in accordance with Piutti's process as described above by reaction of ethyl oxalate with 3-hydroxy-4-methylaniline.

*Example 6*

The procedure of Example 4 is followed using equimolecular quantities of 3-hydroxy-4-methylaniline and mixed ethyl and octadecyl oxalate. A solid white product, octadecyl N-(3-hydroxy - 4 - methylphenyl)oxamate, having a melting point of 177° C. is obtained.

*Example 7*

20.6 g. (0.129 mol) of 1-amino-7-naphthol and 75 cc. of dichloromethane are introduced into a 250 cc. three-necked round-bottomed flask provided with a mechanical stirrer, a dropping funnel and a reflux condenser. The reaction mass is maintained at a temperature of 20–25° C. whilst 23.6 g. (0.173 mol) of ethoxalyl chloride is run-in over a period of 8 minutes. The resulting mixture is heated under reflux for 3 hours 45 minutes, the solvent driven off in vacuo and the product extracted with 100 cc. of water and separated. The separated product is first washed with 5×50 cc. of water and then dissolved in 250 cc. of acetone, the solution obtained being treated with decolourising charcoal, filtered and the acetone driven off by evaporation. The residual product is recrystallised from 300 cc.+150 cc. of ethanol (50%), separated by filtration and then dried in vacuo. 8.7 g. of a solid product, M.P. 147° C. is obtained, identified by gravimetric analysis and infra-red spectrography as ethyl N-(7-hydroxynaphthyl)oxamate. Yield 26% calculated on the aminonaphthol employed.

Example 8

6.35 g. (0.05 mol) of oxalyl chloride are introduced into a 250 cc. three-necked round-bottomed flask provided with a dropping funnel, a reflux condenser and a stirring system, and a solution of 13.5 g. (0.05 mol) of 1-octadecanol in 100 cc. of carbon tetrachloride is run-in over a period of 16 minutes with stirring. This solution is maintained at a temperature of 35° C. and the product is heated under reflux until all evolution of hydrogen chloride ceases.

After cooling, 9.25 g. (0.05 mol) of 4-hydroxydiphenylamine are rapidly introduced, the mixture is heated under reflux, 3.95 g. (0.05 mol) of pyridine are run in and the heating under reflux is continued for 5 hours. The reaction mixture is then allowed to stand for 16 hours at ambient temperature and the carbon tetrachloride eliminated under vacuum. The residue is extracted with 100 cc. of water and the insoluble matter separated and washed with 5× 100 cc. of water, dried and then washed with 250 cc. of petroleum ether.

A white solid is obtained by recrystallisation from 220 cc. of a mixture of ethanol and water (80:20), which, when again washed with 2× 20 cc. of the same solvent mixture and then dried, gives 17.7 g. (yield 69.5% of the theoretical yield) of a product melting at 83° C., identified by elemental analysis and infra-red spectrography as octadecyl N-(4-hydroxyphenyl)-N-phenyloxamate.

Example 9

130 g. (0.3 mol) of octadecyl N-(4-hydroxyphenyl) oxamate obtained by transesterification of ethyl p-hydroxyphenyloxamate with N-octadecanol are suspended in 900 cc. of carbon tetrachloride in a three-litre round-bottomed flask provided with a stirring system, a dropping funnel and a reflux condenser. 45 g. (0.33 mol) of ethoxalyl chloride and then 50 cc. of carbon tetrachloride are run into the flask and the mass is heated under reflux for one hour.

After cooling followed by elimination of the carbon tetrachloride under vacuum, the residue is extracted with 500 cc. of water and the insoluble matter separated and washed with 5× 100 cc. of water. After drying and recrystallisation from 1650 cc. of ethanol, followed by washing with 2× 100 cc. of ethanol and drying, 144.5 g. (yield 90%) of a white solid melting at 100° C. is obtained which is identified by gravimetric analysis and infra-red spectrography as octadecyl (4-ethoxalyloxyphenyl) oxamate.

Example 10

10 g. (0.0231 mol) of octadecyl N-hydroxyphenyloxamate prepared as in Example 9, 2.5 g. (0.232 mol) of 2,6-lutidine and 100 cc. of carbon tetrachloride are introduced into an apparatus identical to that used in Example 8. After stirring, 3.5 g. (0.025 mol) of ethoxymalonyl chloride are run in over a period of 53 minutes at a temperature of 25–28° C. The product is heated under reflux for one hour and the carbon tetrachloride is driven off in vacuo. The residue is extracted with 100 cc. of water and the insoluble fraction is filtered through fritted glass, washed with 3× 250 cc. of water and then dried. It is then extracted with 290 cc. of ethanol, heated under reflux, treated with carbon black and hot-filtered. The solid product obtained by cooling is again filtered through fritted glass, washed with 2× 25 cc. of ethanol, dried and then recrystallised from 210 cc. of ethanol. After separation of the recrystallised product by filtration and drying in vacuo, 7.3 g. (yield 57.3%) of a solid white product melting at 82° C. is obtained which is identified by gravimetric analysis and infra-red spectrography as octadecyl N-(p-ethoxymalonyloxyphenyl)oxamate.

Example 11

50 cc. of carbon tetrachloride and 13.7 g. (0.0316 mol) of octadecyl N-(4-hydroxyphenyl)oxamate prepared as indicated in Example 9 are introduced into an apparatus identical to that used in Example 8. The mixture is stirred and a mixture of 2 g. (0.0158 mol) of oxalyl chloride and 25 cc. of carbon tetrachloride is run in over a period of 8 minutes, and then a solution of 3.4 g. (0.0316 mol) of 2,6-lutidine in 35 cc. of carbon tetrachloride is run in over a period of 7 minutes. The mixture is heated under reflux for 35 minutes and then, after cooling, the carbon tetrachloride is removed by means of a vacuum. The residue is extracted with 100 cc. of water and the insoluble matter separated, washed with 3× 100 cc. of water, dried and recrystallised from 400 cc. of dimethylformamide. After successive washings, first with 15 cc. of dimethylformamide and then with 2× 50 cc. of butanone, followed by recrystallisation from 100 cc. of chlorobenzene and drying, 7.5 g. (yield 50%) of a solid white product melting at 160° C. is obtained, identified by gravimetric analysis and infra-red spectrography as bis-(4-octadecyloxyoxalylaminophenyl)oxalate.

Example 12

7.5 g. (yield 50%) of a solid white product melting at 100° C., identified by gravimetric analysis and intra-red spectrography as bis - (3 - octadecyloxyoxalylamino-4-methylphenyl)oxalate, is obtained from 14.1 g. (0.0316 mol) of octadecyl N-(3-hydroxy-4-methylphenyl)oxamate obtained by transesterification of ethyl 3-hydroxy-4-methylphenyloxamate by means of n-octadecanol using the procedure described in Example 11.

Example 13

The stabilising action of the anti-oxidising compositions of the invention on a commercial polypropylene containing 0.3% of its weight of the hydroxyaryloxamic ester and 0.3% of dilauryl thiodipropionate was determined by measuring the oxygen induction period by Hawkins' method. In each case, two specimens of each composition are prepared; one composition is obtained from a polymer impregnated by an appropriate quantity of a solution, in acetone or other solvent, of the stabilising mixture, the solution containing 1% by weight of the mixture and the solvent being driven off by evaporation in vacuo. The other composition is stabilised in the same way, and then extruded at 200° C. and cut into sections. Films, 0.2 mm. thick, are prepared from these compositions by moulding at 200° C. and test pieces measuring 50× 5 mm. are cut from the films. The tests for resistance to oxidation are carried out in an enclosed space thermostatically regulated at 150° C. in an atmosphere of molecular oxygen. A curve indicating the quantity of oxygen absorbed per gram of stabilised composition, as a function of time in hours is plotted for each specimen, the abscissa of the point corresponding to a rapid increase of the slope being a measure of the induction period of the oxygen absorption at 150° C.

The results of the various tests are set out in the following table, columns (I) being the results obtained with unextruded specimens and columns (II) those obtained with extruded specimens. At the end of the table the results of comparative tests using N,N'-bis(hydroxyphenyloxyamides as stabilising agents are shown.

It will be seen from this table that the stabilising mixtures containing hydroxyaryloxamic esters all impart to polypropylene a resistance of several hundred hours when exposed to the action of molecular oxygen at 150° C., while the bis-hydroxyaryloxamides impart only a very limited stability (60 hours at most). Moreover, only stabilising mixtures containing oxamates of higher alkyls have an effective action when the stabilised compositions have previously been worked at 200° C. before being shaped. The oxamates of lower alcohols have an action which, although not zero, is lower, and the bis-hydroxyaryloxamides have no apparent effect.

| Test No. | Oxamic derivative | Induction period (hours) | | | |
|---|---|---|---|---|---|
| | | Dilauryl thiodipropionate | | | |
| | | Without | | With | |
| | | I | II | I | II |
|---|---|---|---|---|---|
| 1 | Dodecyl N-(4-hydroxyphenyl)-oxamate. | 2 | 2 | 410 | 150 |
| 2 | Octadecyl N-(4-hydroxyphenyl)-oxamate. | 4 | 4 | 380 | 260 |
| 3 | Hexadecyl N-(4-hydroxyphenyl)-oxamate. | 2 | ------ | 250 | ------ |
| 4 | Ethyl N-(4-hydroxyphenyl)-oxamate. | 1 | 0 | 180 | ≃10 |
| 5 | Octyl N-(4-hydroxyphenyl)-oxamate. | 2½ | ------ | 170 | ≃100 |
| 6 | Octadecyl N-3-(hydroxy-4-methylphenyl)oxamate. | 17 | ------ | 350 | ≃300 |
| 7 | Dodecyl N-(3-hydroxy-4-methylphenyl)oxamate. | 2½ | ------ | 265 | >250 |
| 8 | Ethyl N-(7-hydroxynaphthyl)-oxamate. | 7 | ------ | 100 | 40 |
| 9 | Octadecyl N-(4-hydroxyphenyl)-N-phenyloxamate. | 1 | ------ | 240 | 380 |
| 10 | Octadecyl N-(p-ethoxymalonyl-oxyphenyl)oxamate. | 1 | ------ | 580 | 65 |
| 11 | Octadecyl (4-ethoxalyloxy-phenyl)oxamate. | 1 | ------ | 500 | 240 |
| 12 | Bis-(4-octadecyloxyoxalylamino-phenyl)oxalate. | 2½ | ------ | 730 | 420 |
| 13 | Bis-(3-octadecyloxyoxalylamino-4-methylphenyl)oxalate. | 1 | ------ | 935 | 390 |
| 14 | N,N'-bis-(3-hydroxyphenyl)-oxamide. | ½ | 0 | 25 | 0 |
| 15 | N,N'-bis-(4-hydroxyphenyl)-oxamide. | 0 | 0 | 5 | 0 |
| 16 | N,N'-bis-(2-hydroxyphenyl)-oxamide. | 0 | 0 | 60 | 0 |

We claim:

1. A polyolefin composition in which the olefin is a mono-olefin of from 2 to 10 carbon atoms, containing 0.01 to 3% of dilauryl thiodipropionate and 0.01 to 3% of an ester of oxamic acid of the formula:

$$YO-Ar-\underset{X}{N}CO-COOR$$

in which Ar is a phenylene or naphthylene radical or such a radical substituted by a lower alkyl group, the radical YO— being in any position in the phenyl or naphthyl ring; R is alkyl of 2 to 18 carbon atoms; X is hydrogen or phenyl; and Y is hydrogen, ethoxalyloxy, ethoxymalonyloxy, or a group of formula:

$$-CO-COO-Ar-\underset{X}{N}-CO-COOR$$

in which X, R and Ar are as hereinbefore defined.

2. A polyolefin composition according to claim 1 in which the said ester of oxamic acid has the formula:

$$HO-Ar-NHCO-COOR$$

in which Ar is 1,4-phenylene, 4-methyl-1,3-phenylene, 1,7-naphthylene, 1,3-phenylene, or 1,3-naphthylene; and R is alkyl of 2 to 18 carbon atoms.

3. A composition according to claim 1 in which the polymer is a homopolymer or a copolymer of an olefin selected from the group consisting of propylene and its higher homologues.

References Cited by the Examiner

UNITED STATES PATENTS 3,117,104  1/1964  Bown et al. _____ 260—45.85
3,160,680  12/1964  Tholstrup et al. ____ 260—45.85

FOREIGN PATENTS 635,558  1/1964  Belgium.

OTHER REFERENCES

Abstract in Chemical Abstracts, vol. 61 at p. 13485h, France 1,370,879 (5 pp.) is an equivalent of the above cited Belgian patent.

LEON J. BERCOVITZ, *Primary Examiner.*

G. W. RAUCHFUSS, JR., *Assistant Examiner.*